United States Patent
Rech et al.

[11] Patent Number: 5,997,091
[45] Date of Patent: Dec. 7, 1999

[54] HEADREST ARRANGEMENT FOR A MOTOR VEHICLE SEAT

[75] Inventors: Bernd Rech, Saarlouis; Ralf Bergholz, Braunschweig, both of Germany

[73] Assignee: Volkswagen AG, Wolfsburg, Germany

[21] Appl. No.: 09/205,493

[22] Filed: Dec. 4, 1998

[30] Foreign Application Priority Data

Dec. 6, 1997 [DE] Germany .................. 197 54 168

[51] Int. Cl.⁶ .................................................. A47C 7/36
[52] U.S. Cl. .................. 297/391; 297/408; 297/217.3; 297/398
[58] Field of Search .................... 297/391, 398, 297/408, 217.3

[56] References Cited

U.S. PATENT DOCUMENTS

| 2,917,109 | 12/1959 | Marsh . | |
|---|---|---|---|
| 4,042,791 | 8/1977 | Wiseman | 297/391 |
| 4,205,878 | 6/1980 | Wooten | 297/391 |
| 4,490,842 | 12/1984 | Watanbe | 297/391 |
| 4,797,934 | 1/1989 | Hufnagel | 297/391 |
| 4,971,393 | 11/1990 | Maisenhalder | 297/397 |
| 4,991,222 | 2/1991 | Nixdorf | 297/391 |
| 5,108,150 | 4/1992 | Stas et al. | 297/397 |
| 5,411,468 | 5/1995 | Chen | 297/391 |
| 5,531,505 | 7/1996 | Baetz et al. | 297/408 |
| 5,752,742 | 5/1998 | Kerner et al. | 297/391 |

FOREIGN PATENT DOCUMENTS

| 2449193 | 4/1976 | Germany . |
|---|---|---|
| 3820658 | 12/1989 | Germany . |
| 94181675 | 1/1995 | Germany . |
| 19516012 | 7/1996 | Germany . |
| 19513769 | 10/1996 | Germany . |
| 19653516 | 6/1997 | Germany . |
| 9509742 | 4/1995 | WIPO . |

*Primary Examiner*—Anthony D. Barfield
*Attorney, Agent, or Firm*—Baker & Botts, L.L.P.

[57] ABSTRACT

A headrest for a motor vehicle seat has pivoted lateral headrest elements which can be turned into a use position from a storage position is a headrest body. In order to comply with safety standards regarding support and freedom of vision and to satisfy multifunctional headrest requirements, the lateral headrest elements are integrated in the headrest body surface contour in the storage position and can be swung or pivoted out of the headrest body contour by a swinging or pivoting movement.

11 Claims, 2 Drawing Sheets

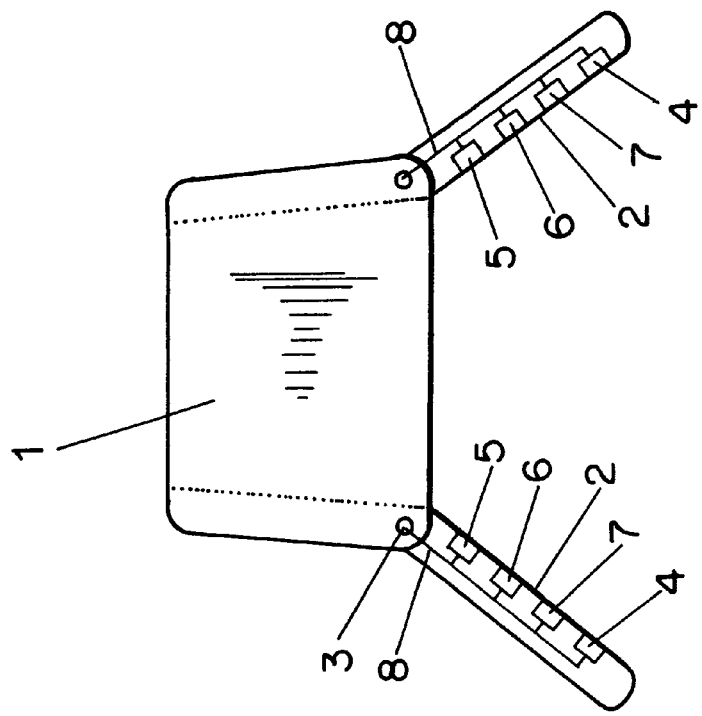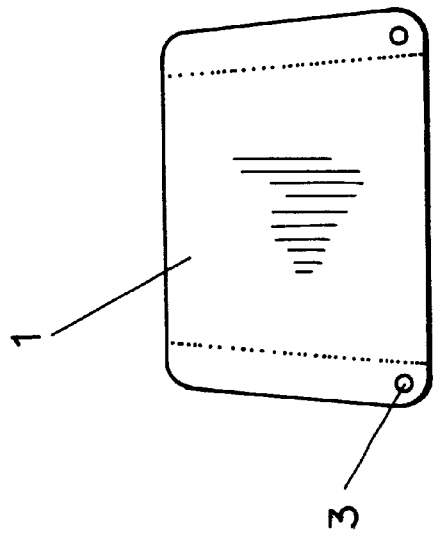

HEADREST ARRANGEMENT FOR A MOTOR VEHICLE SEAT

BACKGROUND OF THE INVENTION

This invention relates to a headrest arrangement for seats, such as motor-vehicle seats, having a pivotally supported headrest element which can be rotated from a storage position into a use position.

Headrests for seats serve primarily to achieve a comfortable sitting posture. This applies not only to seats with headrests for general use but also to motor vehicle seats which include headrests. Rather than serving essentially to provide a comfortable sitting posture, however, motor vehicle seat headrests assure appropriate support for the head and the neck of the seated person in the event of an accident.

A vehicle seat thus primarily has to satisfy safety aspects. This applies in particular to the usually adjustable height position and also to the contour of the headrest. Such a headrest for motor vehicles is known, for example, from U.S. Pat. Nos. 4,971,393 and 5,108,150. As described in those patents, a headrest is arranged so that it can be adjusted in height out of the driver's seat on adjustable rails or rods, and usually has a suitable contour. The headrest contour is normally padded and is intended to satisfy the abovementioned safety requirements. Those patents likewise discloses a side element for the headrest which can be connected to the body of the headrest or to the rod arrangement and can be moved from a storage position into a use position. The side part is connected to a retaining element which can be mounted on the guide elements or rails of the headrest. According to those patents, the lateral headrest referred to therein makes it possible for a passenger to rest his head to the side, for example, during a relatively long journey. This assures a sitting posture in which a passenger's head is in a comfortable position and which relieves stress on the cervical vertebrae, but a headrest which is designed for this purpose, and which because of its shape can only be used for this purpose, is unacceptable, from a safety point of view, for a driver of a motor vehicle. The lateral headrest of those patents is arranged so that it is located beneath the actual headrest, and it is only possible to rest one's head on it if the head is inclined to an extreme extent to either side. The fact that this makes it easy to assume a sleeping position is, of course, unacceptable for a driver and this should not be included in a driver's headrest for safety reasons. In other words, a headrest of this type can only be beneficial for a passenger.

It is also disadvantageous that, despite the presence of an additional lateral headrest, a passenger's head is not supported in the event of a side impact. Added to this is the fact that the low-level position of the lateral headrest in relation to the main headrest results in the cervical vertebrae rather than the head support itself being subjected to extreme mechanical loading in the event of a side impact. This might result in the passenger's neck being broken.

Further arrangements for headrests are known from the prior art. For example, German Gebrauchsmuster No. 94 18 167.5 discloses a headrest arrangement to which lateral headrest elements can be retrofitted. These lateral headrest elements are mounted subsequently and, in particular, rigidly to the main headrest. They may optionally comprise solid elements or else, as explained in this reference, inflatable side elements. The position of the side elements in relation to the main headrest is selected so that they are at the same level as the main headrest. That is, the side parts frame the driver's head, or the head of an individual sitting on the seat, on both sides. The disadvantage with this arrangement is that the headrest is rigid and the side parts have to be connected rigidly to the main headrest element. This rigid arrangement of the side parts is disadvantageous if, for example, the vehicle driver, because of his or her height, for example, does not wish to use one or both side parts. This may be restricting, in particular, when during maneuvering, for example, when the vehicle is moving slowly in order to be positioned accurately, and an unrestricted view to the side is required.

German Offenlegungsschraft No. 195 13 769 discloses a headrest arrangement in which there is also a side part arranged on the headrest. In this case, the side part is merely for mounting a telephone, no provision being made for appropriate support or protection for a passenger's head in the event of a side impact. Moreover, no provision is made for a suitable arrangement which would provide the appropriate protection.

Furthermore, a large number of head support arrangements are known in which electrical elements such as loudspeakers and, as in the abovementioned case, telephones and the like are integrated. Side parts are likewise provided for this purpose, as is disclosed, for example, in U.S. Pat. No. 4,490,842. However, that patent merely discloses side parts which are aligned with the main headrest element and do not provide lateral support for the head. In addition, that patent deals primarily with the arrangement of a loudspeaker device which is positioned in the vicinity of the vehicle passenger's head. Safety aspects are not taken into consideration here at all.

German Patent No. 195 16 012 discloses a protective cover for a motor vehicle seat. That protective cover, however, is arranged to reduce the noise level for vehicle passengers. For this purpose, rather than just having lateral pieces projecting along the sides of the driver's head, the protective cover has a further projecting element arranged above the head, resulting in a continuous protective cover from which it is only possible to see out to the front. A cover which is thus closed on virtually all sides not only causes the freedom of movement of the vehicle passenger, including the vehicle driver, to be restricted and may result in an uncomfortable generation of heat, but, more importantly, obstructs the view of the driver or passenger.

SUMMARY OF THE INVENTION

Accordingly, it is an object of the present invention to provide a headrest for a motor vehicle seat which overcomes disadvantages of the prior art.

Another object of the invention is to provide a headrest having lateral headrest elements which can be adjusted as required and can be stored in a secure position when not in use.

A further object of the invention is to provide a headrest having further functions available when the lateral elements are in the use position.

These and other objects of the invention are obtained by providing a headrest having a lateral headrest element which is integrated in the headrest body in the storage position and can be moved out of the headrest body to a use position by a swinging or pivoting movement.

In accordance with the invention, lateral headrest elements are integrated in the headrest body in the storage position and are maintained in a secure position with respect to the vehicle passengers even in the event of a collision. The fact that the headrest elements can be swung or pivoted out of the headrest body provides the advantage that, on the one hand, the correct height of the lateral elements is predetermined and, on the other hand, the overall position is more compact, even in the storage position, than those of the prior art. When the headrest elements are moved into the storage position, this results in a compact design which does not unnecessarily obstruct the view of the vehicle driver or of other vehicle passengers.

It is, of course, advantageous to provide two lateral headrest elements in each headrest. The ability of the lateral headrest elements to swing or pivot is assured in a suitable and advantageous manner by appropriate positioning of the pivot axis or axis of rotation of each element. A swinging movement is achieved by providing a vertically oriented swinging axis or axis of rotation. Essentially a horizontal axis of rotation is required for a pivoting movement. Furthermore, it is possible for loudspeakers to be integrated in the lateral headrest elements, the loudspeakers being connected to the audio system and/or if appropriate, to a telephone system in the motor vehicle. It is likewise possible for a microphone to be integrated. In the latter case, the cables required can expediently be located in, or in the vicinity of, the axes of rotation. If the axes of rotation are provided, for example, by tubes, then the cables can pass through the same tubes without causing a harmful twisting of the cables when a headrest element swings or pivots.

Furthermore, in one advantageous configuration of the invention, it is possible for elements for voice transmission to other passengers to be provided in the headrest. For this purpose, combined microphone/headphone arrangements may be included in each seat.

In addition, it is advantageously possible to integrate elements for noise compensation in the lateral headrest elements. Such noise compensation elements are used mainly in aircraft to generate sound waves which correspond to those of the vibration prevailing during operation of the aircraft in appropriately reversed phase delay, i.e. usually phase delay by 180°. These compensating sound waves cancel the vibration out, which can inhibit certain aggravating noise. For this purpose, sound generators are usually set up at given locations in aircraft. In the present invention, however, it is advantageous that such countering sound generators are of appropriately small design and can be integrated in the headrest elements according to the invention.

It is likewise possible for further electronic elements used, for example, for voice control of navigation systems and the like, to be integrated in the headrest.

Overall, it is advantageous that, as a result of their integrated arrangement in the headrest, the lateral headrest elements do not obstruct the view when not in use. Thus, if the vehicle driver wishes to maneuver the vehicle, then he or she can swing the headrest elements away into another position to prevent them from obstructing the view.

Also, because they are appropriately positioned on the headrest for swing action or pivoting, the lateral headrest elements are in the correct position when side support is necessary. A passenger's head is thus given optimum protection in the event of a side impact.

BRIEF DESCRIPTION OF THE DRAWING

Further objects and advantages of the invention will be apparent from a reading of the following description in conjunction with the accompanying drawings, in which:

FIGS. 1(a) and 1(b) are plan views illustrating a representative embodiment of a headrest according to the invention having swing-action lateral elements.

DESCRIPTION OF PREFERRED EMBODIMENTS

Figure 2A:
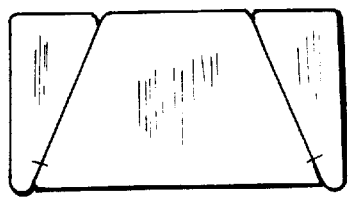
FIGS. 2(a) and 2(b) show plan views illustrating a representative embodiment of a headrest according to the invention having pivotable lateral elements.

FIG. 1(a) is a plan view of a headrest 1 with two lateral headrest elements 2 in the storage position. The lateral headrest elements are integrated in the headrest so that, when in a storage position, there is a continuous surface contour for the headrest without any edges protruding. FIG. 1(b) shows the swung-out position of the lateral headrest elements 2 according to the invention. The axes of rotation 3 of the two lateral headrest elements are oriented vertically in this case so that the headrest elements are swung out of the position shown in FIG. 1(a) by a forward rotation. It can further be seen that the two lateral headrest elements can be moved into the continuous headrest contour so that the surfaces engaged by them tapers inwardly toward the rear. This means that, in the event of a frontal impact, in which all unrestrained masses are accelerated forwardly relative to the vehicle, the lateral elements will not be flung out in an undesired manner. That is to say, there is no active torque which, in the event of an impact, would cause the headrest elements to swing forwardly. Likewise, in the event of an impact from the rear, the headrest elements 2 are safely retained in the storage position and will remain therein. When the lateral headrest elements 2 have been swung out as shown in FIG. 1(b), the same applies in the event of an impact, i.e. rather than swinging randomly forward the headrest elements are held in a specific end position. Consequently, the side parts cannot bang together as a result of forward acceleration caused by a frontal impact, with the result that the driver and the vehicle passengers are not in any danger.

FIG. 1(b) also illustrates schematically various components integrated in the lateral headrest elements 2, including loud speakers 4, microphones 5, elements 6 for voice transmission to other passengers and noise compensation elements 7, all of which are connected to electrical cabling 8 which passes through tubes constituting the axes of rotation 3 for the lateral headrest elements.

Figure 2B:
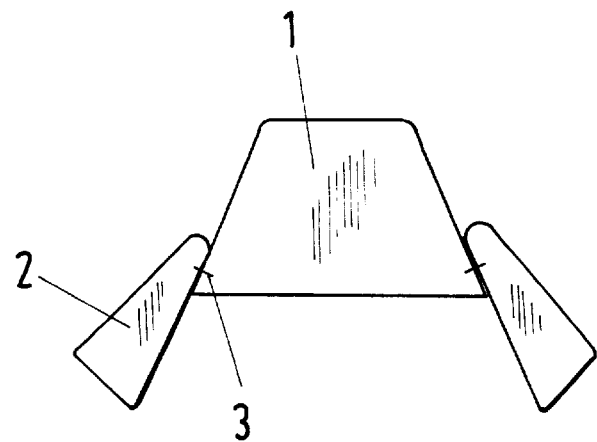

FIGS. 2(a) and 2(b) show a further embodiment of the headrest arrangement according to the invention in which the basic features are essentially the same as those of the above-described embodiment. That is, the storage position of the lateral headrest elements is illustrated in FIG. 2(a) and the position of use is shown in FIG. 2(b).

The storage position in this embodiment according to the invention again provides a continuous outer surface contour of the headrest. It is also the case here that the view is not obstructed when the lateral headrest elements 2 have been pivoted back or are not in use. In this embodiment, the axis of rotation 3 of each element is essentially horizontal and the two axes of rotation are not aligned parallel to each other. This results from the fact that the headrest body 1 has a trapezoidal shape in plan view. In conjunction with the pivoting movement from the storage position into the use position of the headrest elements, this arrangement causes the lateral headrest elements 2 to have a correspondingly sloping or inclined position. As a result, the lateral headrest elements are placed in a storage position which is similar to that in FIG. 1(a). Since the headrest elements 2 are thus oriented at an angle, but not at right angles, this allows a larger field of vision, and thus a better view. It is also the case in this embodiment that, in the event of an impact from the rear, the lateral headrest elements 2 are not flung out. Moreover, the event of an impact from the front, a vertically centered positioning of the axis of rotation avoids an uncontrolled flinging-out action because no torque is applied which favors this during the impact.

Figure 3:
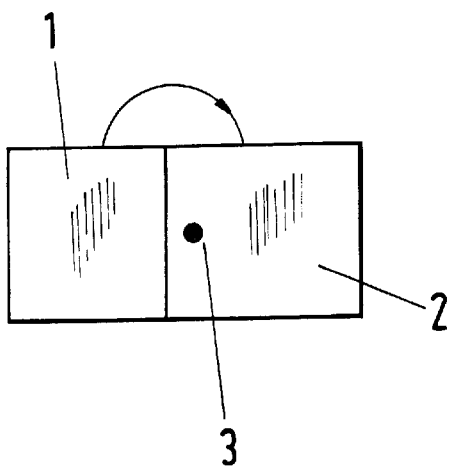
FIG. 3 is a side view of the headrest shown in FIGS. 2(a) and 2(b).

In this respect, FIG. 3 shows a side view of the headrest of FIGS. 2(a) and 2(b) with the lateral headrest elements in the use position. It can be seen in this illustration that the pivot axis is centrally positioned forwardly of and in line with the center of mass of the lateral headrest element 2 so that, either in the storage position or in the use position, an acceleration from the front cannot produce a torque which causes a pivoting movement in an uncontrolled manner. Thus, the lateral headrest elements arranged according to the invention not only have the above-described advantages but also satisfy a high standard of safety.

Although the invention has been described herein with reference to specific embodiments, many modifications and variations therein will readily occur to those skilled in the art. Accordingly, all such variations and modifications are included within the intended scope of the invention.

We claim:

1. A headrest arrangement for a motor vehicle seat comprising a headrest body and a lateral headrest element mounted on the headrest body by a mounting arrangement having an axis of rotation about which the lateral headrest element can be turned from a storage position into a use position and a microphone integrated in the lateral headrest element, wherein the lateral headrest element is integrated in an outer surface contour of the headrest body in the storage position and, by a turning movement, can be moved out of the lateral outer surface headrest contour.

2. A headrest arrangement according to claim 1 including two lateral headrest elements mounted on the headrest body so that they are integrated in the headrest body outer surface contour in the storage position.

3. A headrest arrangement according to claim 1 wherein the lateral headrest element can be swung out of the headrest body surface contour about a vertical axis in order to reach the use position.

4. A headrest arrangement according to claim 1 wherein the lateral headrest element can be pivoted from the storage position into the use position about a horizontal axis.

5. A headrest arrangement according to claim 1 wherein the lateral headrest element is provided with an integrated loudspeaker.

6. A headrest arrangement according to claim 1 including a device for voice transmission to passengers in the lateral headrest element.

7. A headrest arrangement according to claim 1 including a device for noise compensation integrated in the lateral headrest element.

8. A headrest arrangement according to claim 1 including at least one electronic component selected from the group consisting of communication systems, navigation systems and voice controlled input interfaces, integrated in the lateral headrest element.

9. A headrest arrangement according to claim 1 including an electrical cable extending into the lateral headrest element along its axis of rotation.

10. A headrest arrangement according to claim 1 wherein the axis is located forwardly of and horizontally in line with the center of mass of the lateral headrest element.

11. A headrest arrangement according to claim 1 wherein, in the storage position, the lateral headrest element extends rearwardly along a line corresponding to a side of a trapezoid shape so that, in the event of an acceleration force applied from the front or rear, the lateral headrest element is not flung out of the storage position in an undesired and uncontrolled manner.

* * * * *